US009547741B2

(12) United States Patent
Schroeder et al.

(10) Patent No.: US 9,547,741 B2
(45) Date of Patent: Jan. 17, 2017

(54) METHODS, APPARATUS, AND SYSTEM FOR USING FILLER CELLS IN DESIGN OF INTEGRATED CIRCUIT DEVICES (71) Applicant: GLOBALFOUNDRIES INC., Grand Cayman (KY)

(72) Inventors: Uwe Paul Schroeder, Los Gatos, CA (US); Sushama Davar, Santa Clara, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 23 days.

(21) Appl. No.: 14/518,939

(22) Filed: Oct. 20, 2014

(65) Prior Publication Data

US 2016/0110489 A1    Apr. 21, 2016

(51) Int. Cl.
*G06F 17/50*  (2006.01)
*H01L 29/06*  (2006.01)
*H01L 29/66*  (2006.01)

(52) U.S. Cl.
CPC ....... *G06F 17/5072* (2013.01); *G06F 17/5068* (2013.01); *G06F 17/5077* (2013.01); *G06F 17/5081* (2013.01); *G06F 2217/02* (2013.01); *G06F 2217/06* (2013.01); *H01L 29/0661* (2013.01); *H01L 29/6681* (2013.01)

(58) Field of Classification Search
CPC .............. G06F 17/5068; G06F 17/5072; H01L 29/6681; H01L 29/0661; H01L 27/0207
USPC .......................................... 716/118, 119, 123
See application file for complete search history.

(56) References Cited

U.S. PATENT DOCUMENTS

| | | | | |
|---|---|---|---|---|
| 5,867,434 A * | 2/1999 | Oh | ..................... | H01L 27/10897 257/E27.097 |
| 5,946,563 A * | 8/1999 | Uehara | .................. | H01L 23/485 257/E23.019 |
| 6,670,665 B2 * | 12/2003 | Beer | .................... | H01L 27/0207 257/296 |
| 7,257,790 B2 * | 8/2007 | Maeda | .................... | G03F 1/144 257/E27.108 |
| 8,530,963 B2 * | 9/2013 | Davies | ................ | H01L 29/0661 257/333 |
| 9,324,866 B2 * | 4/2016 | Yu | ...................... | H01L 21/82380 |
| 2002/0144224 A1 * | 10/2002 | Frerichs | .............. | G06F 17/5068 716/55 |
| 2002/0153537 A1 * | 10/2002 | Segawa | ............. | H01L 21/28052 257/202 |
| 2004/0049754 A1 * | 3/2004 | Liao | .................... | G06F 17/5068 716/120 |
| 2012/0286331 A1 * | 11/2012 | Aton | ................... | H01L 27/0207 257/202 |

(Continued)

*Primary Examiner* — Helen Rossoshek
(74) *Attorney, Agent, or Firm* — Williams Morgan, P.C.

(57) ABSTRACT

At least one method, apparatus and system disclosed involves circuit layout for an integrated circuit device. A design for an integrated circuit device is received; The design comprises a first functional cell and a second functional cell. The first functional cell is placed on a circuit layout. A determination is made as to whether the first cell comprises a vertical boundary that is electrically floating. A filler cell is placed adjacent to the vertical boundary on the circuit layout in response to determining that the first cell comprises the vertical boundary that is electrically floating. The second functional cell is placed adjacent to the filler cell to form a contiguous active area on the circuit layout.

19 Claims, 8 Drawing Sheets (56) References Cited

U.S. PATENT DOCUMENTS

| | | | | |
|---|---|---|---|---|
| 2013/0182502 A1* | 7/2013 | Cheo | ...................... | G11C 16/14 |
| | | | | 365/185.2 |
| 2014/0054714 A1* | 2/2014 | Baars | ................ | H01L 29/66545 |
| | | | | 257/368 |
| 2014/0282344 A1* | 9/2014 | Hsu | ..................... | G06F 17/5072 |
| | | | | 716/123 |
| 2014/0291748 A1* | 10/2014 | Kanda | ............... | H01L 27/11517 |
| | | | | 257/316 |
| 2014/0367794 A1* | 12/2014 | Chan | .................. | H01L 27/1104 |
| | | | | 257/390 |

\* cited by examiner

METHODS, APPARATUS, AND SYSTEM FOR USING FILLER CELLS IN DESIGN OF INTEGRATED CIRCUIT DEVICES

FIELD OF THE INVENTION

Generally, the present disclosure relates to the manufacture of sophisticated semiconductor devices, and, more specifically, to various methods and structures for using filler cells for provide a contiguous active area for manufacturing semiconductor devices.

DESCRIPTION OF THE RELATED ART

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed on a group of semiconductor wafers, sometimes referred to as a lot, using semiconductor-manufacturing tools, such as exposure tool or a stepper. As an example, an etch process may be performed on the semiconductor wafers to shape objects on the semiconductor wafer, such as polysilicon lines, each of which may function as a gate electrode for a transistor. As another example, a plurality of metal lines, e.g., aluminum or copper, may be formed that serve as conductive lines that connect one conductive region on the semiconductor wafer to another.

In this manner, integrated circuit chips may be fabricated. In some cases, integrated circuit or chips may comprise various devices that work together based upon a hard-coded program. For example, application-specific integrated circuit (ASIC) chips may use a hard-coded program for various operations, e.g., boot up and configuration processes. The program code, in the form of binary data, is hard-coded into the integrated circuit chips.

Figure 1:
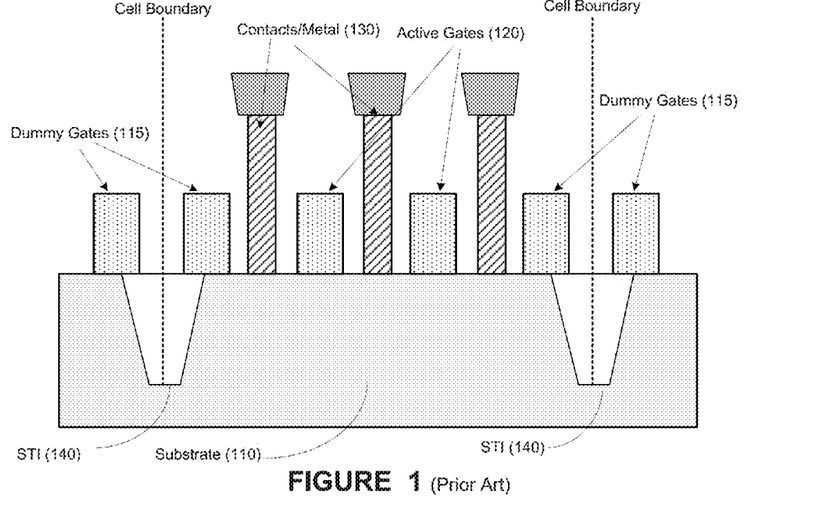
FIG. 1 illustrates a stylized depiction of a cross-sectional view of a prior art cell boundary comprising a double diffusion break (DDB) isolation.

When designing a layout of various devices with an integrated circuits (e.g., CMOS logic architecture), designers often select pre-designed functional cells comprising various features (e.g., diffusion regions, transistors, metal lines, vias, etc.) and place them strategically to provide an active area of an integrated circuit. Often, adjacent cells are required to be electrically isolated from each other to prevent leakage currents. One method used by designer to electrically isolate active areas between cells is to use a shallow trench isolation (STI) scheme. FIG. 1 illustrates a typical STI implementation for electrically isolating active areas between cells.

Turning now to FIG. 1, a stylized depiction of a cross-sectional view of a prior art cell boundary comprising a double diffusion break (DDB) isolation, is illustrated. A plurality of features may be formed on a silicon substrate (110). Within a cell, a plurality of dummy gates 115 may be formed at the cell boundaries. Further, the cell may include active gates 120, as well as contacts and metal features 130 that are formed on the substrate 110. At the cell boundaries, a shallow trench isolation (STI) 140 feature may be formed in the substrate 110. Dummy gates 115 relating to adjacent cells may be formed on the other side of the STI 140. Currents from floating dummy gates 115 are generally block by the STI. The isolation requires two contacted poly pitches (CPPs) per cell. This is generally known as double diffusion break (DDB). One of the problems of the DDB approach is that the CPPs are costly in terms of area cost per cell.

Figure 2:
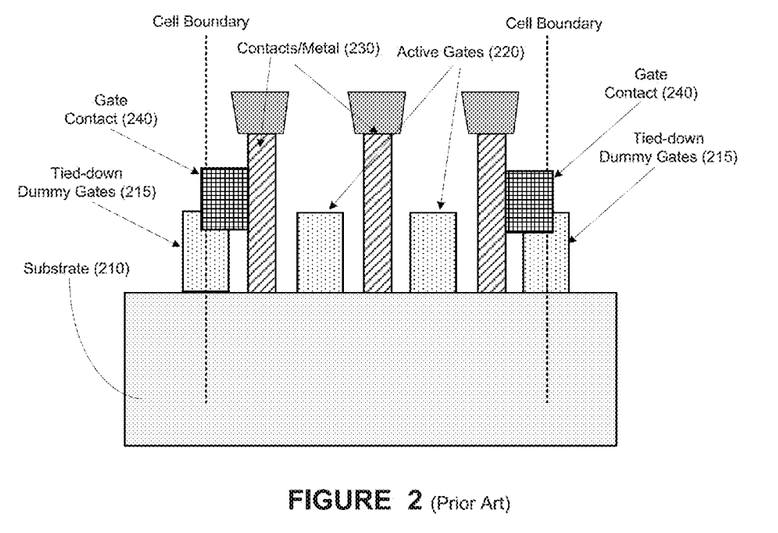
FIG. 2 illustrates a stylized depiction of cross-sectional view of a prior art cell boundary that includes a continuous active area.

Another approach that designers have used to achieve electrical insulation between cells is to use a continuous active area coupled with a tie down dummy gate over the cell boundary. FIG. 2 illustrates a stylized depiction of cross-sectional view of a prior art cell boundary that includes a continuous active area. A plurality of features may be formed on a silicon substrate (210). Within a cell, a plurality of dummy gates 215 may be formed at the cell boundaries. Further, the cell may include active gates 120, as well as contacts and metal features 230 formed on the substrate 110. The dummy gates 215 at the cell boundaries may be electrically tied down. A gate contact 240 may connect the dummy gate to power. In light of the fact that the dummy gates 215 are tied down, the dummy gates 215 are generally always off, and thus no current flows across the cell boundaries. This isolation can potentially reduce the cell size by one CPP per cell, depending on the power connections. Further, one of the problems of this prior art implementation is than since a connection to power is required immediately adjacent to the tie down dummy gate 215 at the cell boundary, most cells will require the addition of a tie-down element. This may cause the addition of one or more CPPs, which causes increased area penalty and negates the potential area savings of continuous active area with gate tie-down isolation.

The present disclosure may address and/or at least reduce one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various methods, apparatus and system for providing a circuit layout for an integrated circuit device. A design for an integrated circuit device is received. The design comprises a first functional cell and a second functional cell. The first functional cell is placed on a circuit layout. A determination is made as to whether the first cell comprises a vertical boundary that is electrically floating. A filler cell is placed adjacent to the vertical boundary on the circuit layout in response to determining that the first cell comprises the vertical boundary that is electrically floating. The second functional cell is placed adjacent to the filler cell to form a contiguous active area on the circuit layout.

BRIEF DESCRIPTION OF THE DRAWINGS

The disclosure may be understood by reference to the following description taken in conjunction with the accompanying drawings, in which like reference numerals identify like elements, and in which.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments herein provide for electrical isolation between semiconductor functional cells that are used to design and provide layouts for fabricating integrated circuit devices. In many embodiments, the functional cells may be pre-defined and stored in a library. Embodiments herein provide for defining a continuous active area on a semiconductor device using functional cells, wherein the active area may have the characteristic of lower area loss by selectively adding filler cells. Filler cells may comprise components on its boundaries (e.g., dummy gates) that are electrically tied down for providing electrical isolation between adjacent functional cells. For example, a dummy gate over an N-type diffusion region becomes electrically isolating when it is tied to $V_{DD}$. The dummy gate 215 over a P-type diffusion region becomes electrically isolating by tying it to ground. Filler cells may be opportunistically added between various functional cells selected from a library, such that the total area for an integrated circuit area or logic block may be reduced.

Further, embodiments herein provide for one or more portions of a library comprising pre-defined functional cells to be converted into one or more continuous active library components, while providing for decreased area usage. In some embodiments, an entire library may be converted into a continuous active area library. These converted libraries may be used to generate a design of an integrated circuit that utilized less area on a semiconductor device.

Figure 3:
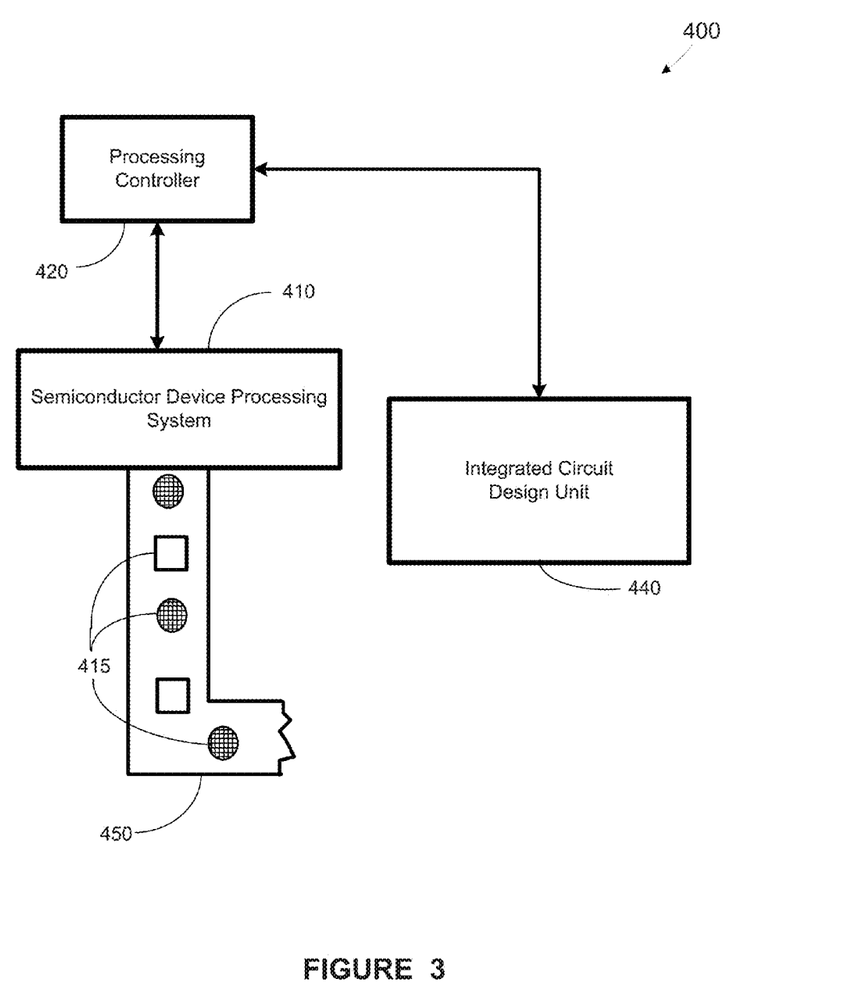
FIG. 3 illustrates a stylized block diagram depiction of a system in accordance with some embodiments herein.

Turning now to FIG. 3, a stylized block diagram depiction of a system in accordance with some embodiments herein, is illustrated. The system 400 of FIG. 3 may comprise a semiconductor device processing system 410 and an integrated circuit design unit 440. The semiconductor device processing system 410 may manufacture integrated circuit devices based upon one or more designs provided by the integrated circuit design unit 440.

The semiconductor device processing system 410 may comprise various processing stations, such as etch process stations, photolithography process stations, CMP process stations, etc. One or more of the processing steps performed by the processing system 410 may be controlled by the processing controller 420. The processing controller 420 may be a workstation computer, a desktop computer, a laptop computer, a tablet computer, or any other type of computing device comprising one or more software products that are capable of controlling processes, receiving process feedback, receiving test results data, performing learning cycle adjustments, performing process adjustments, etc.

The semiconductor device processing system 410 may produce integrated circuits on a medium, such as silicon wafers. The production of integrated circuits by the device processing system 410 may be based upon the circuit designs provided by the integrated circuits design unit 440. The processing system 410 may provide processed integrated circuits/devices 415 on a transport mechanism 450, such as a conveyor system. In some embodiments, the conveyor system may be sophisticated clean room transport systems that are capable of transporting semiconductor wafers. In one embodiment, the semiconductor device processing system 410 may comprise a plurality of processing steps, e.g., the $1^{st}$ process step, the $2^{nd}$ process set, etc., as described above.

In some embodiments, the items labeled "415" may represent individual wafers, and in other embodiments, the items 415 may represent a group of semiconductor wafers, e.g., a "lot" of semiconductor wafers. The integrated circuit or device 415 may be a transistor, a capacitor, a resistor, a memory cell, a processor, and/or the like. In one embodiment, the device 415 is a transistor and the dielectric layer is a gate insulation layer for the transistor.

The integrated circuit design unit 440 of the system 400 is capable of providing a circuit design that may be manufactured by the semiconductor processing system 410. In one embodiment, the integrated circuit design unit 440 may perform a cell boundary analysis for determining whether a filler cell may be used to provide more efficient area-utilization of an integrated circuit area. In some embodiments, the integrated circuit design unit 440 may provide one or more prompt to a user regarding the possibility of adding a filler cell.

In other embodiments, the integrated circuit design unit 440 may perform an automated determination of locations where a filler cell may be incorporated, automatically select a filler cell, and automatically incorporate the filler cell into a design. For example, once a designer or a user of the integrated circuit design unit 440 generates a design using a graphical user interface to communicate with the integrated circuit design unit 440, the unit 440 may perform automated modification of the design using filler cells. In other embodiments, the integrated circuit design unit 440 may be capable of automatically converting one or more cells in a library into a continuous active area. A more detailed description of the integrated circuit design unit 440 is provided in FIG. 4 and accompanying description below.

The system 400 may be capable of performing analysis and manufacturing of various products involving various technologies. For example, the system 400 may design and production data for manufacturing devices of CMOS technology, Flash technology, BiCMOS technology, power devices, memory devices (e.g., DRAM devices), NAND memory devices, and/or various other semiconductor technologies.

Figure 4:
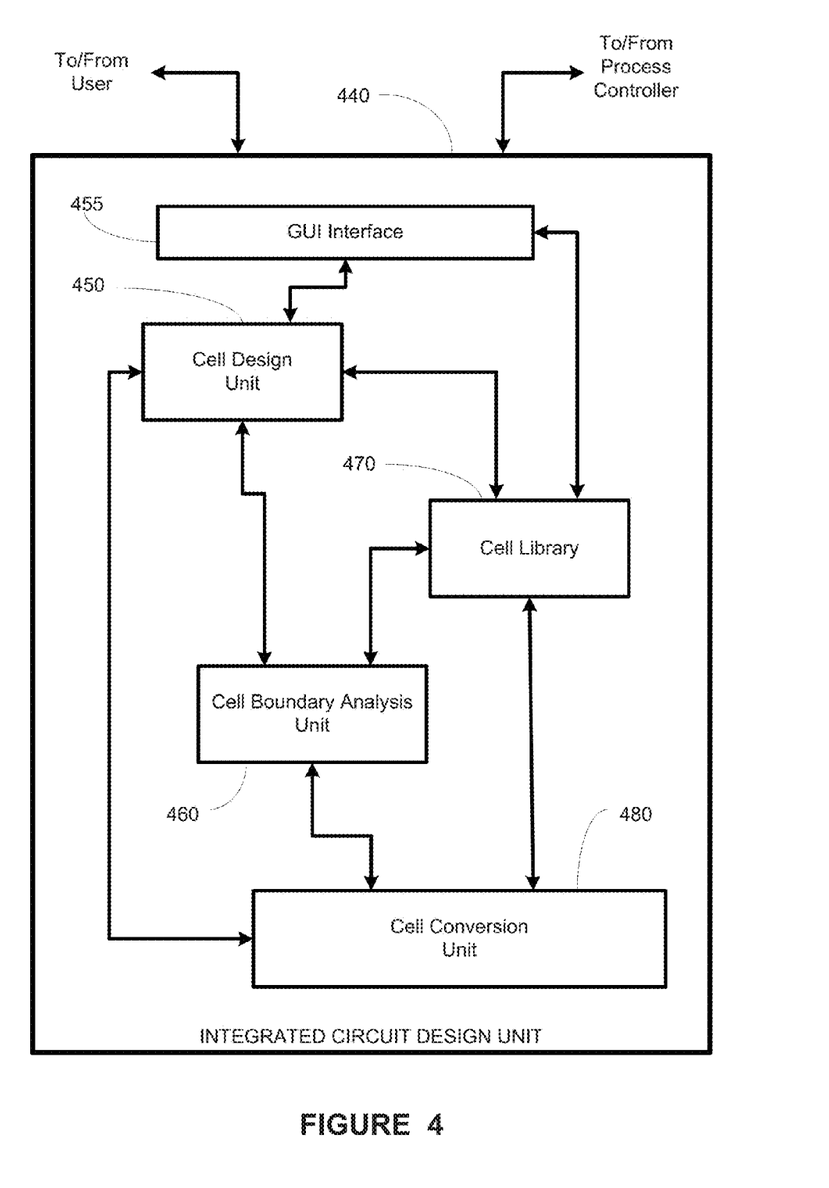
FIG. 4 illustrates a block diagram depiction of the integrated circuit design unit of FIG. 3, in accordance with embodiments herein.

Turning now to FIG. 4, a block diagram depiction of the integrated circuit design unit of FIG. 3, in accordance with embodiments herein, is illustrated. The integrated circuit design unit 440 comprises a cell design unit 450, a cell boundary analysis unit 460, a cell library 470, and a cell conversion unit 480.

The cell design unit 450 may provide for cell placement based upon the desired functionality of an integrated circuit device. In one embodiment, the cell design unit 450 may provide an automated integrated circuit layout using various cells from the cell library 470. In this embodiment, the cell library 470 may contain cells with STI insulation at the cell boundary. The cell conversion unit 480 may strip the STI from the cell boundaries and convert the cells into a continuous active area design. The cell conversion unit 480 may determine whether a gate tie-down can be placed within the cell, and may add this element as necessary. During placement of the cell, the cell boundary analysis unit 460 may decide whether a filler cell adding an insulating gate tie-down element should be added, or whether isolation is provided by the adjacent cells. The circuit layout(s) may be used by the system 400 to fabricate various integrated circuit devices.

In other embodiments, the cell design unit 450 may facilitate entry of an integrated circuit design by a user, e.g., by providing a GUI communications system. A user may interface with the integrated circuit design unit 440 via a GUI interface 455. The cell boundary analysis unit 460 may perform an analysis of the boundaries of cells that are being used in an integrated circuit design. As cells are being placed, the cell boundary analysis unit 460 may determine whether a filler cell can be added between cells to create a more efficient, continuous active area. For example, the cell boundary analysis unit 460 may determine whether particular cells contain unprotected boundaries. Unprotected boundaries may refer to cells that comprise vertical boundaries that may be electrically floating, i.e., not tied to power or ground. One example of an unprotected boundary is a dummy gate at the boundary of a cell, wherein the dummy gate is not tied to power or ground. Unprotected boundaries may cause leakage current to flow between the boundary of one cell to the boundary of another cell. Moreover, unprotected boundaries will emerge for those types of cells that cannot place a power supply connection on the last diffusion area before either cell boundary. The cell boundary analysis unit 460 may also check various predetermined rules to ensure the cell placement are in compliance with the rules. In some embodiments, the cell boundary analysis unit 460 may select filler cells that may be comprise tie down components on its boundaries to place adjacently with cells with unprotected boundaries. In some cases, the cell boundary analysis unit 460 may modify the rules to cause the cell placements to be in compliance with design rules.

The cell conversion unit 480 is capable of converting one or more cells used on a design or a cell located in the cell library 470. The conversion may entail identifying candidate cells for conversion and using filler cells to create more efficient, contiguous active areas. In some cases substantially all of the cell library 470 may be converted in to active areas.

In an alternative embodiment, the cell library 470 may already be the form of a continuous active area layout, and thus in this embodiment, there may be no need for a cell conversion unit 480. The cell boundary analysis unit 460 may operate as described above, determining whether a filler cell is needed, or whether the isolation is provided by a gate tie down element in the adjacent cell.

Figure 5:
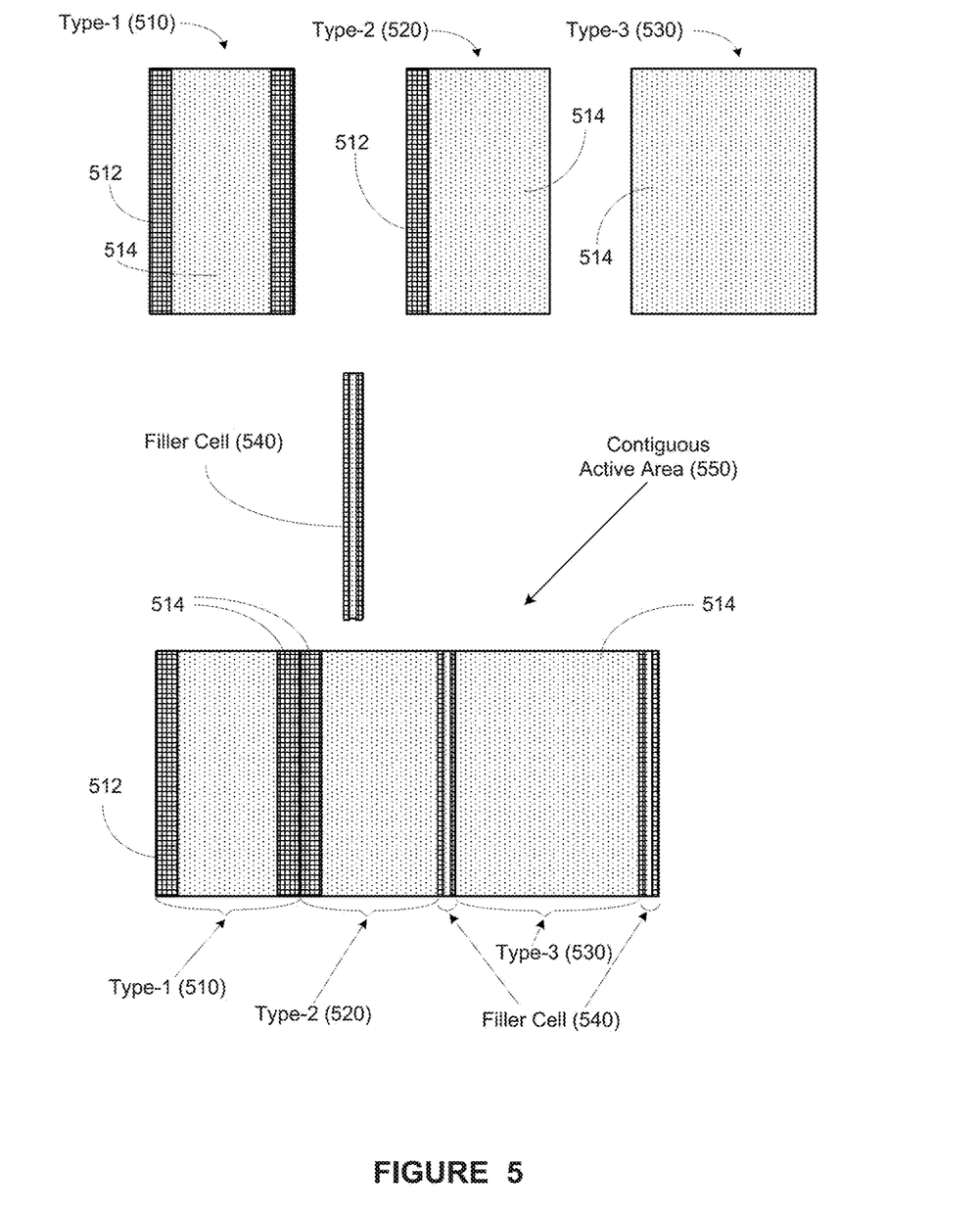
FIG. 5 illustrates a stylized simplified depiction of coupling filler cells to standard cells, in accordance with embodiments herein.

Turning now to FIG. 5, a stylized simplified depiction of coupling filler cells to standard cells, in accordance with embodiments herein, is illustrated. FIG. 5 illustrates a type-1 library cell 510, a type-2 library cell 520, a type-3 library cell 530 a, $1^{st}$ filler cell 540, and a contiguous active area 550. The type-1 cell 512 comprises power taps through vias on both vertical edges 512. The area 514 represents other components of the cell, such as the source and drain of a transistor, metal lines, etc. The type-2 cell 530 comprises a power tap only on one vertical edge 512. The type-3 cell has no power taps on its vertical edges. Moreover, the $1^{st}$ filler cell 540 is a 1 CPP cell that comprises a power tap that causes both edges to be tie down.

In one embodiment, the $1^{st}$ filler cell 540 may be strategically positioned between the types-1, 2 and 3 library cells 510, 520, 530 in a manner that provides an area-efficient contiguous active area, such as the active area 550. The library cells 510-530 and the filler cells 540 may be arranged in such a manner that electrical isolation is achieved between each cell. For example, since the type-1 library cell has a power tap on the right vertical edge and the type-2 library cell 520 has a power tap on the left vertical edge, these library cells can be positioned adjacently as shown in active area 550, while achieving electrical isolation at their intersection. However, since there are no tie down components at the intersection between the type-2 library cell 520 and the type-3 library cell 530, the filler cell 540, which is tied down, may be placed between them, as shown in active area 550 in order to achieve electrical isolation at their intersection. Further, since the type-3 library cell 530 does not have a tie down element at the right edge, another filler cell 540 may be placed adjacently. In this manner, a contiguous active area 550 may be formed. In another embodiment, the filler cell 540 may be used strategically to convert one or more of the library cells 510-530 in a library into one or more contiguous active areas.

Figure 6:
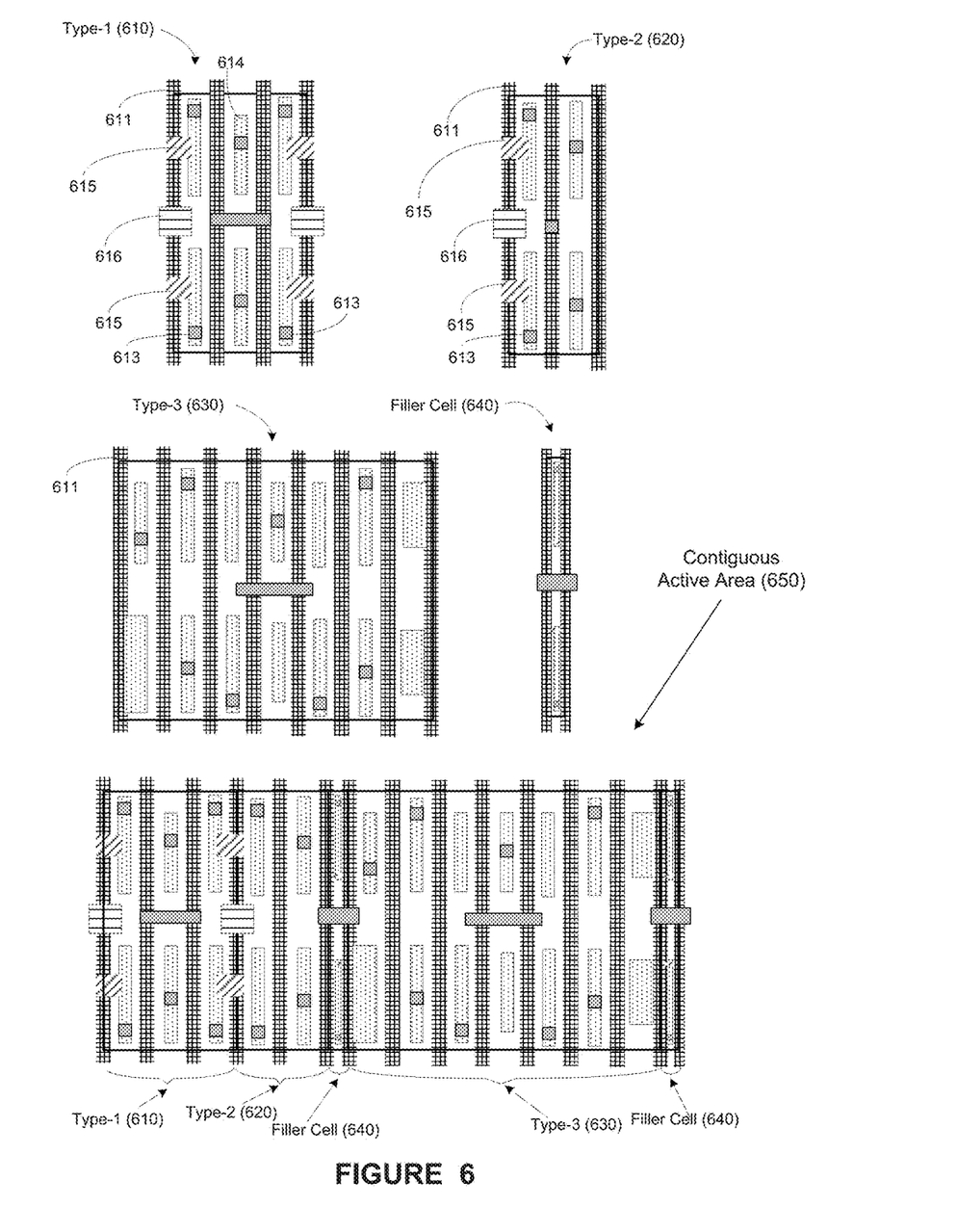
FIG. 6 illustrates a more detailed stylized depiction of coupling filler cells to standard cells of FIG. 5, in accordance with embodiments herein.

FIG. 6 illustrates a more detailed stylized depiction of coupling filler cells to standard cells of FIG. 5, in accordance with embodiments herein, is illustrated. Referring simultaneously to FIGS. 5 and 6, a type-1 library cell 610 may comprise various elements. For example, the type-1 library cell 610 may comprise, power taps 613 at both edges and gates 611 that are tied down at both vertical edges. The cell 610 also comprises diffusion contacts 614 that connect to a power rail. A plurality of vias 613 provide power taps on the vertical edges of the cell 610. Gate contacts 615 may connect the dummy gates to power through the diffusion contacts 614 and the vias 613. A gate cut shape 616 may provide a safeguard against causing a short between $V_{DD}$ and $V_{SS}$.

A type-2 library cell 620 may comprise similar components as the cell 610. However, the type-2 library cell 620 contains power tap for only one vertical edge. Further, the type-3 library cell contains a greater number of CPPs, but does not contain power taps for either one of the vertical edges. The filler cell 640 comprises tie down dummy gates for both of its edges. More detailed descriptions of the filler cell 640 are provided in FIGS. 7-9 and accompanying descriptions below. Similar to the scheme of FIG. 5, a contiguous active area 650 is created by placing the library cells 610-630 and the filler cells 640 in the manner shown in the active area 650. Thus various cells are positioned together to form a contiguous active area while maintaining electrical isolation between the cells.

Figure 7:
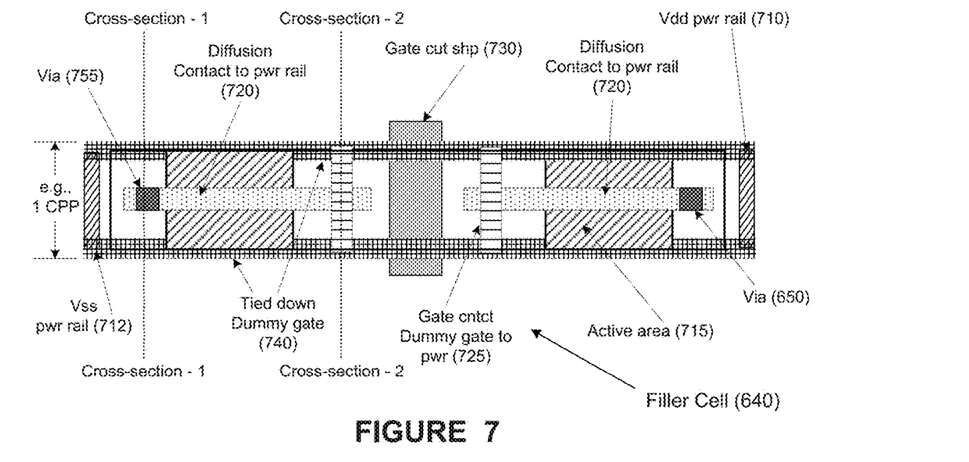
FIG. 7 illustrates a stylized depiction of a filler cell of FIG. 6, in accordance with one embodiment.

Turning now to FIG. 7, a stylized depiction of a filler cell of FIG. 6, in accordance with one embodiment, is illustrated. In one embodiment, the filler cell 640 is a tie down filler cell and is about 1 CPP. The filler cell 640 comprises a $V_{DD}$ power rail (710) of metal-1, a $V_{SS}$ power rail (712) an active area 715, and a diffusion contact 720 providing a connection to a power rail. Gate contacts 725 provide dummy gates 740 with power, through the diffusion contacts 720 and vias 755 that provide a connection to power. The filler cell 640 is capable of providing isolation between various functional cells while providing for space savings due to the strategic stackability of the filler cells 640 between selected functional cells. Cross-sectional views of two areas (labeled "cross-section-1 and cross-section-2) are provided respectively in FIGS. 8 and 9.

Figure 8:
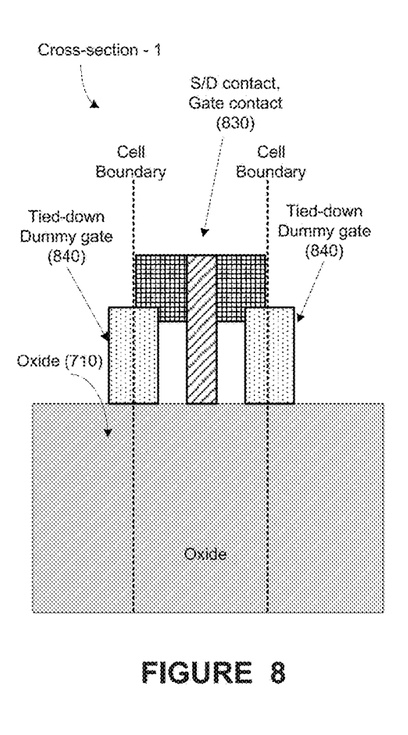
FIG. 8 illustrates a stylized cross-section view of a first location of the filler cell of FIG. 7, in accordance with some embodiments.

Turning now to FIG. 8, a stylized cross-section view of a first location of the filler cell of FIG. 7, in accordance with some embodiments herein is illustrated. FIG. 8 illustrates a cross-sectional view of the area labeled "cross-section-1" in FIG. 7. On a base dielectric (e.g., oxide) layer 810, two tied-down dummy gates 840 are formed at the cell boundaries. Source/drain contacts 820 are formed over the oxide layer 810. The tied down dummy gates 840 provide for electric isolation at the cell boundaries.

Figure 9:
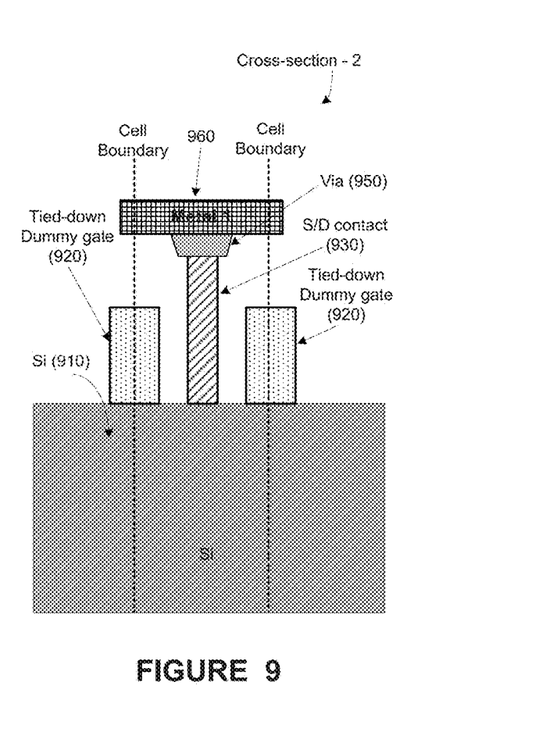
FIG. 9 illustrates a stylized cross-section view of a second location of the filler cell of FIG. 7, in accordance with some embodiments.

Similarly, FIG. 9 illustrates a stylized cross-section view of a second location of the filler cell of FIG. 7, in accordance with some embodiments herein. FIG. 9 illustrates a cross-sectional view of the area labeled "cross-section-2" in FIG. 7. The cross-sectional view of FIG. 9 illustrates a silicon layer 910 upon with dummy gates 920 are formed. A source/drain feature 930 is formed is connected to a metal-1 960 layer through a via 950. The tied down dummy gates 920 provide for electric isolation at the cell boundaries.

The filler gate 640 of FIGS. 7-9 are formed within 1 CPP and may be strategically placed between various library cells, converting the library cells in to contiguous active area(s). Further, the filler cell of FIG. 7-9 are provided as example, and those skilled in the art having benefit of the present disclosure may implement a variety of types of filler cells and remain within the scope of the present disclosure.

Figure 10:
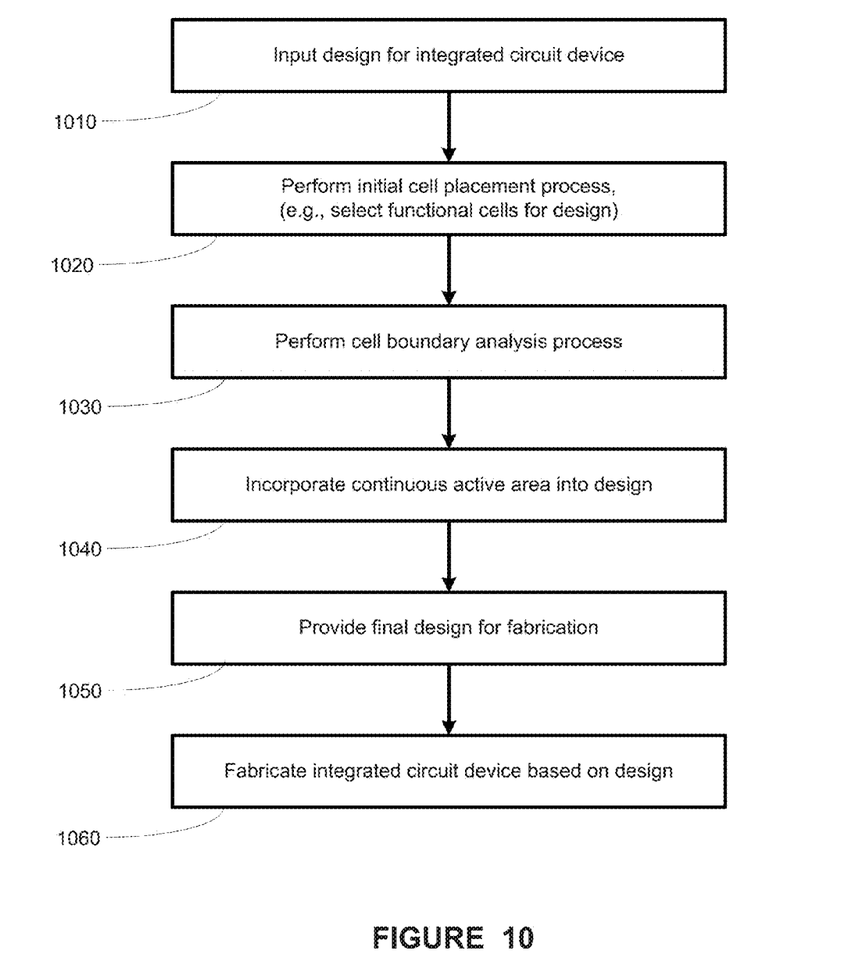
FIG. 10 illustrates a flowchart representation of a method for using filler cells to provide a contiguous active area for manufacturing semiconductor devices.

Turning now to FIG. 10, a flowchart representation of a method for using filler cells to provide a contiguous active area for manufacturing semiconductor devices, is illustrated. A design for an integrated circuit device may be entered into a design entry device, such as the integrated circuit design unit 440 (block 1010). The design may comprise definitions for functionality of various portions of an integrated circuit device, data relating to placement of circuit components, selection of functional cells, etc. Based upon the design, in one embodiment, an initial cell placement of functional cells may be implemented (block 1020). A cell boundary analysis may be performed (block 1030). The cell boundary analysis may be performed prior to performing cell placement, during cell placement, or after cell placement. One objective for performing the cell boundary analysis is to generate contiguous active area where the boundaries of each cell are tied down for electrically isolating each functional cell to reduce leakage currents. A more detailed description of the cell boundary analysis is provided in FIG. 11 and accompanying description below.

Upon performing the cell boundary analysis, the contiguous active area that was generated may be incorporated into the design of the integrated circuit device (block 1040). The design of the integrated circuit device may be finalized (block 1050). Based upon the finalized the design, fabrication of the integrated circuit device may be performed (block 1060).

Figure 11:
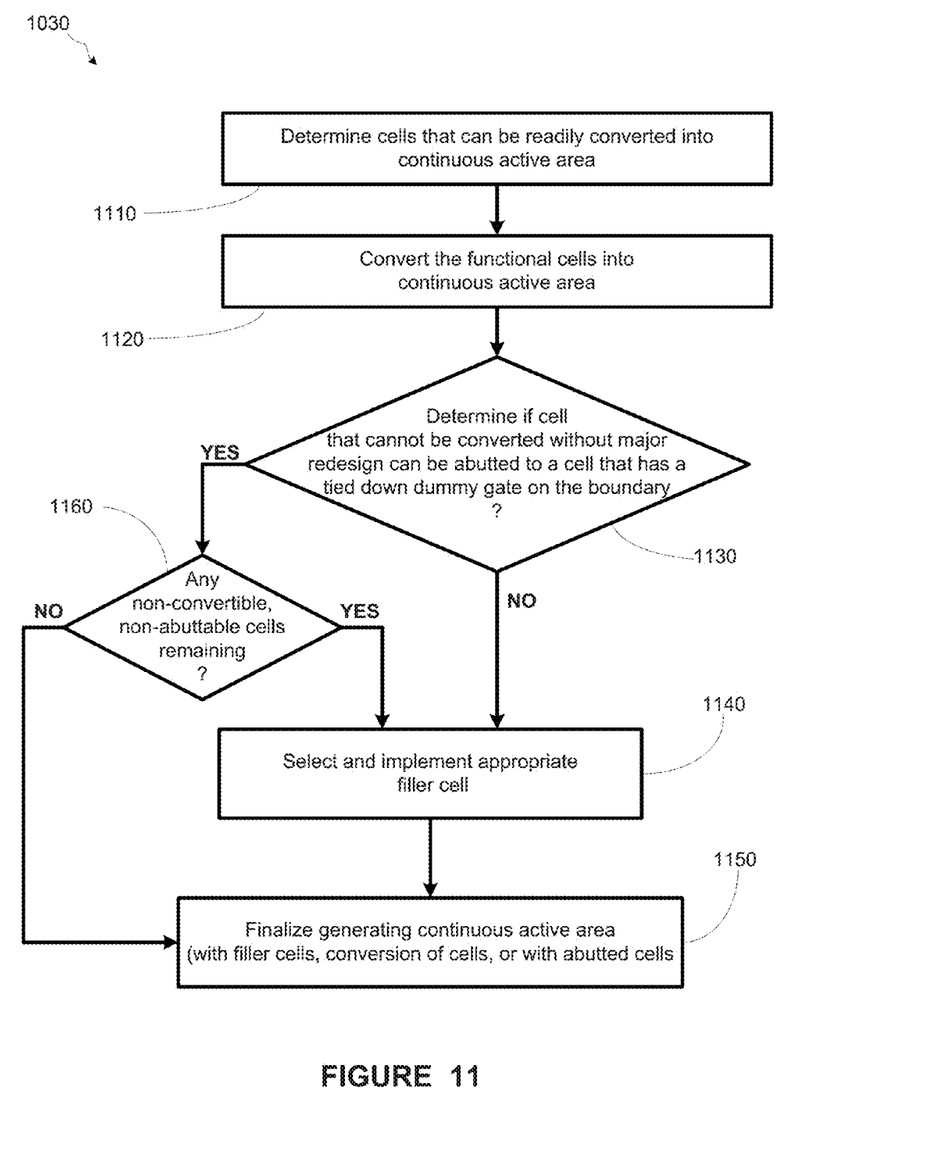
FIG. 11 illustrates a flowchart depiction for performing the cell boundary analysis of FIG. 10, in accordance with embodiments herein, is illustrated.

Turning now to FIG. 11, a flowchart depiction for performing the cell boundary analysis of FIG. 10, in accordance with embodiments herein, is illustrated. The design unit 440 may determine functional cells that can be readily converted into continuous active area(s) (block 1110). For example, functional cells with at least one vertical boundary that has power taps on the last diffusion layer prior to the dummy gate terminating the cells may be readily converted into continuous active area(s).

A determination is made whether a first functional cell that cannot be readily converted without resorting to major redesign can be abutted to a second functional cell that contains a tied down dummy gate on a vertical boundary (block 1130). In this manner, electrical isolation may be achieved at the intersection of the first and second functional cells. Upon finding the inquiry of block 1130 to be in the affirmative, a determination is made whether there remains cells that are not readily convertible and are non-abutted (block 1060). If not, the generating of one or more contiguous active areas is finalized (block 1150). This finalization may relate to generating contiguous active areas using the cell conversion described above, using abutted cells, and/or using filler cells. If a determination is made that cells that are not readily convertible and are non-abutted remains, one or more filler cells may be selected for placement between the remaining cell (block 1140).

Referring back to block 1130, if the inquiry of block 1130 reveals that a first functional cell that cannot be readily converted without resorting to major redesign cannot be abutted to a second functional cell that contains a tied down dummy gate on a vertical boundary, an appropriate filler cell may be selected and implemented into the contiguous active area (block 1140). Further, the contiguous active area(s) may then be finalized using converted cells, abutted cells, and/or filler cells (block 1150).

Using embodiments herein, space saving of in designs that use cells may be realized. Embodiments herein provide for using one or more filler cells for conversion of functional cells into efficient, contiguous active area. Further, using embodiments herein, a various types of function layers stored in libraries may be converted to more efficient, contiguous active areas using the filler cells described above.

Although in some examples, circuits herein were described in terms of NMOS devices for consistency, those skilled in the art would appreciate that concepts described herein may also apply to PMOS devices and remain within the scope of embodiments herein.

The system 400 may be capable of manufacturing and testing various products that include transistors with active and inactive gates involving various technologies. For example, the system 400 may provide for manufacturing and testing products relating to CMOS technology, Flash technology, BiCMOS technology, power devices, memory devices (e.g., DRAM devices), NAND memory devices, processors, and/or various other semiconductor technologies.

The methods described above may be governed by instructions that are stored in a non-transitory computer readable storage medium and that are executed by, e.g., a processor in a computing device. Each of the operations described herein (e.g., FIGS. 3-4 and 10-11) may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for providing a layout for an integrated circuit device, comprising:
   receiving a design for an integrated circuit device, wherein said design comprises
   a first functional cell and a second functional cell;
   placing said first functional cell on a circuit layout;
   determining whether said first cell comprises a vertical boundary that is electrically floating;
   placing a filler cell adjacent to said vertical boundary on said circuit layout in response to determining that said first cell comprises said vertical boundary that is electrically floating;
   placing said second functional cell adjacent to said filler cell to form a contiguous active area on said circuit layout,
   fabricating, by a semiconductor device processing system, said integrated circuit device based upon said circuit layout.

2. The method of claim 1, wherein fabricating said integrated circuit based upon said circuit layout comprises fabricating at least one of a transistor, a capacitor, a resistor, a memory cell, or a processor.

3. The method of claim 1, wherein said determining whether said first cell comprises a vertical boundary that is electrically floating comprises determining whether said first cell comprises a circuit element that is not electrically tied to at least one of ground or power.

4. The method of claim 3, wherein determining whether said first cell comprises a circuit element that is not electrically tied to at least one of ground or power comprises determining whether said first element comprises a dummy gate of a transistor that is electrically tied to at least one of ground or power.

5. The method of claim 1, wherein placing said filler cell adjacent to said vertical boundary comprises placing a filler cell that comprises a circuit element that is tied to at least one of ground or power at each of the vertical boundaries of said filler cell.

6. The method of claim 5, placing said filler cell that comprises a circuit element that is tied to at least one of ground or power at each of the vertical boundaries comprises placing said filler cell that comprises a dummy gate that is tied to at least one of ground or power at each of the vertical boundaries of said filler cell.

7. The method of claim 1, further comprising:
   converting said first functional cell into a first contiguous active area; and
   converting said second functional cell into a second contiguous active area.

8. The method of claim 7, further comprising providing said first contiguous active area and said second contiguous active area into a circuit layout for fabricating said integrated circuit device.

9. The method of claim 1, further comprising:
   converting said first functional cell into a first contiguous active area and storing said first contiguous active area into a design library that is accessible for generating a design; and
   converting said second functional cell into a second contiguous active area and storing said first contiguous active area into a design library that is accessible for generating a design.

10. The method of claim 1, wherein placing a filler cell adjacent to said vertical boundary on said circuit layout further comprises selecting one of a plurality of filler cells for placing based upon at least one characteristic of said vertical boundary of said first functional cell.

11. The method of claim 1, wherein placing said filler cell comprises placing a filler cell that has a dimension of one contacted poly pitch (CPP).

12. An apparatus for providing a design for and fabricating an integrated circuit device, the apparatus comprising:
an integrated circuit design unit adapted to:
place a first functional cell on a circuit layout;
determine a first characteristic of a vertical boundary of said first functional cell;
select a first filler cell from a plurality of filler cells based upon said first characteristic;
place said first filler cell adjacent to said first functional cell to provide an electrical isolation between said first filler cell and said first functional cell for providing a first contiguous active area on said circuit layout, and
a semiconductor device processing system adapted to fabricate an integrated circuit device based upon said circuit layout.

13. The apparatus of claim 12, further comprising a library that comprises said first functional cell and said plurality of filler cells, and wherein said library comprises a continuous active area layout.

14. The apparatus of claim 12, wherein said integrated circuit design unit is further configured to place a second function cell adjacent to said first filler cell to provide an electrical isolation between said first filler cell and said second functional cell for providing a second contiguous active area on said circuit layout.

15. The apparatus of claim 14, wherein said integrated circuit design unit is configured to provide a design output comprising said circuit for fabricating an integrated circuit device.

16. The apparatus of claim 12, wherein said first characteristic is indicative of a circuit component at a vertical boundary of said first function cell being electrically floating.

17. A system, comprising:
an integrated circuit design unit adapted to:
place a first functional cell on a circuit layout;
determine a first characteristic of a vertical boundary of said first functional cell;
select a first filler cell from a plurality of filler cells based upon said first characteristic; and
place said first filler cell adjacent to said first functional cell to provide an electrical isolation between said first filler cell and said first functional cell for providing a first contiguous active area on said circuit layout;
a semiconductor device processing system adapted to fabricating an integrated circuit device based upon said circuit layout; and
a processing controller operatively coupled to said semiconductor device processing system, said processing controller configured to control an operation of said semiconductor device processing system.

18. The system of claim 7, wherein said first characteristic is indicative of a circuit component at a vertical boundary of said first function cell being electrically floating.

19. The system of claim 18, wherein said integrated circuit design unit is further configured to place a second function cell adjacent to said first filler cell to provide an electrical isolation between said first filler cell and said second functional cell for providing a second contiguous active area on said circuit layout.

* * * * *